United States Patent Office

> 3,407,253
> ORIENTED POROUS POLYOLEFIN-ELASTOMER BLEND SHEETS AND PROCESS OF MAKING SAME
> Shohei Yoshimura and Takeshi Yamaguchi, Shiga Prefecture, Japan, assignors to Toyo Boseki Kabushiki Kaisha, Osaka, Japan
> Filed May 3, 1966, Ser. No. 547,358
> Claims priority, application Japan, May 4, 1965, 40/26,260
> 11 Claims. (Cl. 264—289)

ABSTRACT OF THE DISCLOSURE

An oriented sheet of a mixture of 100 parts by weight of at least one crystallizable polyolefin and from 30 to 300 parts by weight of at least one elastomer, the sheet having a number of voids from $2\mu$ to 5 mm. in size, having a density of less than 0.80 g./cm.$^3$, being permeable, being non-transparent and having a leather-like appearance.

---

The present invention relates to polyolefin sheets, and production thereof. More particularly, it relates to oriented "sheets" (this term being hereinafter unificatively used, although other terms such as "films" and "plates" may be also employed) of crystallizable polyolefins admixed with elastomers, having "voids" (this term being hereinafter unificatively used, although other terms such as "foams," "hollows," "cavities" and "caves" may be also employed) and being of low densities, and production thereof.

As to the manufacture of polyolefin products having voids therein, there has been known a method for forming voids by the use of blowing agents, such as azobisbutyronitrile, dinitropentamethylenetetramine and benzenesulfonyl hydrazide. There has also been known a method for forming voids in sheets of crystallizable polypropylene by subjecting the sheets to neck-drawing.

Figure 1:
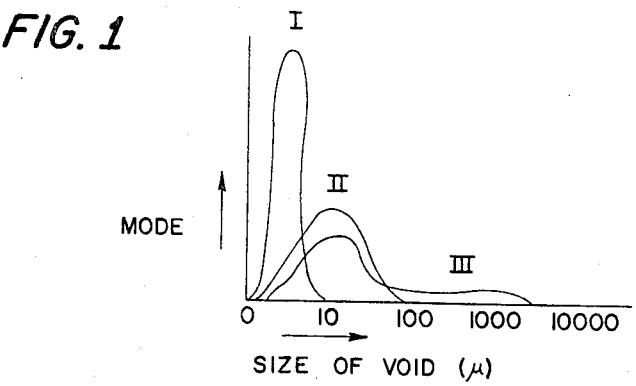
Figure 2:
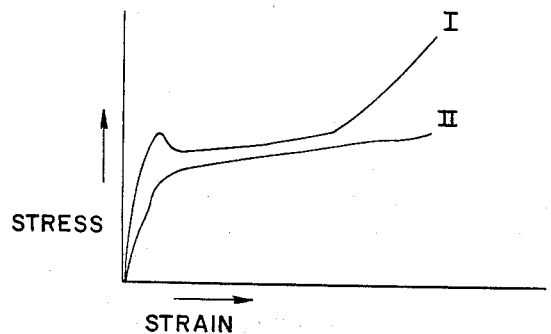
Figure 3:
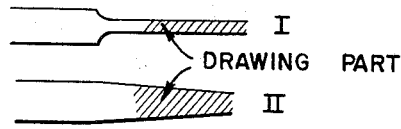

Apart from the said known methods, there has now been discovered that sheets of crystallizable polyolefins admixed with elastomers are drawn to form voids therein. The incorporation of small amounts of elastomers into polyolefins for improving such physical properties of the latter as impact strength, abrasion resistance, tear strength, toughness and producibility has been well known. However, the formation of voids by drawing sheets of crystallizable polyolefins admixed with elastomers has never been known. It should be noted that the voided sheets thus obtained are essentially different from those obtained by subjecting polypropylene to neck-drawing. The said essential difference may be understood from FIGURES 1 to 3 in the attached drawing. In FIGURE 1, the curves I and II show respectively the length distributions of the short axis and the long axis of the voids formed in the sheet of polypropylene oriented uniaxially and the curve III shows the length distribution of the voids in the oriented sheet of polypropylene admixed with polyisobutylene, the distribution being L-shaped. In FIGURE 2, the curve I shows the relationship between stress and strain in the neck-drawing of a polyproylene sheet and the curve II does that in the drawing of a sheet of polyproylene admixed with polyisobutylene. In FIGURE 3, the figures I and II show respectively the sections of the drawing parts of a neck-drawn sheet of polypropylene and of a drawn sheet of polypropylene admixed with polyisobutylene. The present invention is based on the above discovery.

A main object of the present invention is to embody polyolefin sheets having voids whereby their density is low. Another object of this invention is to embody polyolefin sheets possessing non-transparency, leather-like appearance and good permeability to gases and liquids. A further object of the invention is to embody a process for preparing the said polyolefin sheets. These and other objects will be apparent to those conversant with the art to which the present invention pertains from the subsequent description.

The polyolefin sheet of the present invention can be prepared by drawing an orientable sheet of a mixture comprising as essential components at least one kind of crystallizable polyolefin and at least one kind of elastomer.

Hereupon, the term "orientable sheet" is intended to mean the unoriented or partially oriented one which can be drawn further in at least one direction.

One of the essential components is one or more kinds of crystallizable polyolefins. Examples of the polyolefin are homopolymers of olefins, such as ethylene, propylene, butene-1, 4-methylpentene-1, 3-methylbutene-1 and 3,3-dimethylbutene-1, and interpolymers of one or more kinds of the said olefins as the principal unit with or without one or more kinds of other monomers, such as vinyl acetate, methyl methacrylate and styrene. They may be used alone or in the form of mixture. They may be also used as mixtures with other polymers and/or additives, such as stabilizers and antistatic agents. In general, the use of the polyolefin having an intrinsic visiosity of 0.8 to 6.0 dl./g., especially of 1.4 to 4.0 dl./g., in tetralin at 135° C. is preferred. From the practical and economical point of view, the most preferred polyolefin is polypropylene, particularly isotactic polypropylene, for instance, produced by employing a Ziegler-Natta catalyst.

The other essential component is one or more kinds of elastomers. As the elastomer, there may be used natural rubber, synthetic rubbers and their analogues admixed or not with blending agents and/or modified or not by conventional procedures, such as cyclization and chlorination. Specific examples of the synthetic rubbers are polyisobutylene, isobutylene-isoprene copolymer, polybutadiene, styrene-butadiene copolymer, acrylonitrile-butadiene copolymer and ethylene-propylene copolymer. In general, it is preferred to use the elastomer having a molecular weight of 30,000 to 1,000,000, especially of 50,000 to 600,000, which is determined from the intrinsic viscosity in toluene at 25° C. The use of polyisobutylene or isobutylene-isoprene copolymer is particularly preferred.

In order to obtain the polyolefin sheet having voids of the present invention, at least one kind of crystallizable polyolefin is first mixed with at least one kind of elastomer by conventional mechanical operations using a Banbury mixer, a mixing roll, a pelletizer or the like. The said essential components may be mixed each in a variety of forms, such as powders, pellets, flakes and blocks. In some cases, either one or both of them may be mixed in the form of solution or dispersion. The mixing amount of the elastomer to 100 parts by weight of the crystallizable polyolefin may be usually in the range of 5 to 500 parts by weight, preferably of 30 to 300 parts by weight. In the mixing, there may be added stabilizers, fillers, antistatic agents, pigments and the like. When the amount of the elastomer is too small, neck is sometimes formed. Such formation may be avoided by increasing the amount of the elastomer.

The thus obtained mixture containing at least one kind of crystallizable polyolefin and at least one kind of elastomer is then shaped in an orientable sheet by conventional processes, such as wet process, dry process and melt process. The shaping may be effected with a T-die or a circular die.

The resulting orientable sheet is then subjected to uniaxial or biaxial drawing in a gas like air or a liquid like water. The drawing may be effected by a single or plural step. In alternative, the shaping and drawing of the orientable sheet may be simultaneously performed, for instance, by inflation method. The draw ratio in uniaxial drawing is usually in the range of 1.2 to 7, preferably of 1.5 to 5. In the case of biaxial drawing, the sheet may be consecutively drawn first in the machine direction and then in the transverse direction, or vice versa. The draw area ratio is usually in the range of 5 to 40, preferably of 10 to 30. The temperature on drawing may be below the melting point of the polyolefin used, preferably at least 10° C. below the melting point.

The thus oriented sheet has numerous voids which are distributed from the surface to the inside and of 2μ to 5 mm. in size. The shapes of the voids are generally indeterminate and depend on the kinds and the mixing ratio of the components in the sheet. If forcedly compared, the shapes are alike to those of amebas. In general, the size of the voids becomes smaller with increasing the amount of the elastomer and larger with increasing the draw ratio. Accordingly, the size distribution of the voids in the oriented sheet as shown in FIGURE 1 may be changed by the drawing conditions, but the L-shape itself as shown in FIGURE 1 may remain essentially unchanged.

Although the mechanism of the formation of the voids is not clear, it may be assumed that the elastomer incorporated in the polyolefin can not be deformed freely on drawing and the undeformable parts from the voids.

Since the said oriented sheet contains a number of voids from the surface to the inside, its density is extremely low and generally less than 90% of those of the starting polyolefin or of the starting elastomer. In general, the density is less than 0.80 g./cm.³, occasionally less than 0.7 g./cm.³. Moreover, the said sheet has good permeability to gases and liquids, non-transparency, leather-like appearance and lusterless surface (usually less than 75% in reflection coefficient).

The voided sheet as above prepared may be per se used for interior articles, personal ornaments, construction materials and the like in place of leather.

In order to enhance the usefulness of the said product, the above illustrated fundamental process may be partly and suitably modified.

For instance, the elastomer may be subjected to cross-link formation (i.e. vulcanization) at any step after mixing with the polyolefin so that the mechanical properties of the voided sheet, such as recovery from deformation on compression and the strength, are highly improved. Explaining in detail, the vulcanized sheet having voids may be prepared by mixing at least one kind of crystallizable polyolefin with at least one kind of elastomer admixed with one or more kinds of cross-linking agents (e.g. sulfur, selenium, tellurium, propane-1,3-dithiol, N,N-dithiomorpholine, zinc oxide, magnesium oxide, dinitrobenzene, trinitrobenzene, dicumyl peroxide, 2,5-di-t-butyl-peroxyhexene, tetramethylthiuram disulfide, p-quinone dioxime, p,p'-dibenzoylquinone dioxime), shaping an orientable sheet from the resulting mixture, drawing the orientable sheet to produce voids therein and vulcanizing the voided sheet under conventional vulcanization conditions. In alternative, the vulcanized sheet having voids may be prepared by soaking the voided sheet previously produced according to the said fundamental process in a solution or dispersion of one or more kinds of the cross-linking agents and then vulcanizing the resulting sheet. When required, such conventional auxiliary agents as vulcanization-accelerators (e.g. guanidines, aldehyde-ammonia, aldehyde-amines) or vulcanization retarders (e.g. salicylic acid, phthalic acid) may be used together with the said cross-linking agents.

Further, for instance, the vulcanized or unvulcanized sheet having voids may be subjected to treatment for the introduction of ionically exchangeable groups therein. One example is to introduce sulfonic acid groups into the sheets by treating with sulfuric acid. Another example is to introduce quaternary ammonium base groups in the sheet by treating with methyl monochloromethyl ether, followed by treatment with trialkylamine. The thus treated sheets have ion-exchange capacity and may be utilized as ion-exchange membranes.

Further, for instance, a variety of compounds may be introduced in the voids of the vulcanized or unvulcanized voided sheet and, if desired, subjected to various reactions there. One example is to introduce aromatic substances (e.g. perfumes) therein. Another example is to introduce polymerizable monomers and allow the same to polymerize therein.

Furthermore, for instance, the vulcanized or unvulcanized sheet having voids may be processed by conventional processing methods generally used for sheets, such as embossing, electric discharge and coating.

Practical and presently-preferred embodiments of the present invention are illustratively shown in the following examples. In these examples, parts represent parts by weight and the composition ratio of monomers in copolymers is represented by percent by weight.

Example 1

A polyolefin and an elastomer(s) are mixed in a mixing roll. The mixture is shaped into sheets by an extruder or a heat press. The resulting orientable sheets are drawn to produce voids therein. In Table 1, there are shown the properties of the drawn sheets determined by the following methods: density, dividing the weight of 1 cm.² of the sheet by the thickness; tensile strength and elongation, ASTM D882–54T B; vapor permeability, ASTM E96–53T.

TABLE 1

| No. | Polyolefin (Intrinsic viscosity) | Elastomer (Molecular weight) | Mixing ratio | | Mixing condition | | Shaping condition | | Thickness of orientable sheet (mm.) | Drawing | | Density (g./cm.³) | Tensile strength (kg./cm.²) | Elongation (percent) | Vapor permeability (mg./cm.²/hr. mm.) |
|---|---|---|---|---|---|---|---|---|---|---|---|---|---|---|---|
| | | | Polyolefin | Elastomer | Temperature (°C.) | Time (min.) | Operation | Temperature (°C.) | | Temperature (°C.) | Ratio | | | | |
| 1 | (HDPE¹) (0.965) | Ethylene-propylene (35:65) copolymer (0.7×10⁵) | 70 | 100 | 195 | 7 | H⁴ | 210 | 1.0 | 45 | 3×3⁶ | 0.160 | | | |
| 2 | HDPE (1.25) | Polybutadiene (cis-1,4) (2.0×10⁵) | 100 | 50 | 230 | 7 | E⁵ | 250 | 1.0 | 50 | 3 | 0.432 | 132 | 32 | |
| 3 | HDPE (1.25) | Ethylene-propylene (20:80) copolymer (0.6×10⁵) | 100 | 50 | 230 | 7 | E | 250 | 1.0 | 50 | 3 | 0.415 | 120 | 37 | |

TABLE 1

| No. | Polyolefin (intrinsic viscosity) | Elastomer (Molecular weight) | Mixing ratio Polyolefin | Mixing ratio Elastomer | Mixing condition Temperature (°C.) | Mixing condition Time (min.) | Shaping condition Operation | Shaping condition Temperature (°C.) | Thickness of orientable sheet (mm.) | Drawing Temperature (°C.) | Drawing Ratio | Density (g./cm.³) | Tensile strength (kg./cm.²) | Elongation (percent) | Vapor permeability (mg./cm.²/hr. mm.) |
|---|---|---|---|---|---|---|---|---|---|---|---|---|---|---|---|
| 4 | HDPE (1.25) | Polyisoprene (1.0×10⁶) | 100 | 50 | 230 | 7 | E | 250 | 1.0 | 50 | 3 | 0.407 | 115 | 62 | |
| 5 | HDPE (1.25) | Butadiene-styrene (85:15) copolymer (1.5×10⁶) | 100 | 50 | 230 | 7 | E | 250 | 1.0 | 50 | 3 | 0.441 | 150 | 49 | |
| 6 | HDPE (1.25) | Butadiene-acrylonitrile (75:25) copolymer (2.0×10⁶) | 100 | 50 | 230 | 7 | E | 250 | 1.0 | 50 | 3 | 0.409 | 130 | 38 | |
| 7 | MDPE² (1.30) | Polybutadiene (cis-1,4) (2.0×10⁶) | 100 | 50 | 230 | 7 | E | 250 | 1.0 | 50 | 3 | 0.413 | 82 | 53 | |
| 8 | MDPE (1.30) | Butadiene-acrylonitrile (75:25) copolymer (2.0×10⁶) | 100 | 50 | 230 | 7 | E | 250 | 1.0 | 50 | 3 | 0.410 | 95 | 45 | |
| 9 | PP³ (1.95) | Polybutadiene (cis-1,4) (4.0×10⁶) | 100 | 50 | 230 | 7 | E | 250 | 1.0 | 50 | 3 | 0.353 | 160 | 27 | |
| 10 | PP (1.95) | Ethylene-propylene (35:65) copolymer (3.5×10⁶) | 100 | 50 | 230 | 7 | E | 250 | 1.0 | 50 | 3 | 0.342 | 155 | 60 | |
| 11 | PP (1.95) | Polyisoprene (3.0×10⁶) | 100 | 50 | 230 | 7 | E | 250 | 1.0 | 50 | 3 | 0.331 | 162 | 27 | |
| 12 | PP (1.95) | Butadiene-styrene (75:25) copolymer (3.0×10⁶) | 100 | 50 | 230 | 7 | E | 250 | 1.0 | 50 | 3 | 0.345 | 160 | 25 | |
| 13 | PP (1.95) | Isobutylene-isoprene (95:5) copolymer (1.5×10⁶) | 100 | 100 | 230 | 7 | E | 250 | 1.0 | (⁷) | 4×4⁶ | 0.09 | 120 | 20 | |
| 14 | PP (1.95) | Isobutylene-isoprene (95:5) copolymer (1.5×10⁶) | 100 | 30 | 230 | 7 | E | 250 | 1.0 | 50 | 3 | 0.338 | 177 | 33 | |
| 15 | PP (1.95) | Isobutylene-isoprene (95:5) copolymer (1.5×10⁶) | 100 | 100 | 230 | 7 | E | 250 | 1.0 | 50 | 3 | 0.339 | 142 | 50 | |
| 16 | PP (1.95) | Isobutylene-isoprene (95:5) copolymer (1.5×10⁶) | 100 | 200 | 230 | 7 | E | 250 | 1.0 | 50 | 3 | 0.352 | 130 | 62 | |
| 17 | PP (1.95) | Isobutylene-isoprene (95:5) copolymer (1.5×10⁶) | 100 | 300 | 230 | 7 | E | 250 | 1.0 | 50 | 3 | 0.382 | 110 | 70 | |
| 18 | PP (1.95) | Isobutylene-isoprene (95:5) copolymer (1.5×10⁶) | 100 | 100 | 230 | 7 | E | 250 | 1.0 | 100 | 3 | 0.375 | 131 | 37 | |
| 19 | PP (1.95) | Isobutylene-isoprene (95:5) copolymer (1.5×10⁶) | 100 | 100 | 230 | 7 | E | 250 | 1.0 | 120 | 1.5 | 0.402 | 120 | 50 | |
| 20 | PP (1.95) | Isobutylene-isoprene (95:5) copolymer (1.5×10⁶) | 100 | 100 | 230 | 7 | E | 250 | 1.0 | 50 | 4.5 | 0.690 | 131 | 80 | |
| 21 | PP (1.95) | Isobutylene-isoprene (95:5) copolymer (1.5×10⁶) | 100 | 100 | 230 | 7 | E | 250 | 1.0 | 50 | 2.3 | 0.338 | 182 | 20 | |
| 22 | PP (1.87) | Polyisobutylene (5.0×10⁶) | 130 | 70 | 100 | 5 | H | 185 | 1.0 | 35 | 2.5 | 0.453 | 115 | 50 | 8 |
| 23 | PP (1.87) | Polybutadiene (cis-1,4) (4.0×10⁶) | 100 | 100 | 100 | 5 | H | 240 | 1.0 | 25 | 3.0 | 0.460 | 130 | 30 | 9 |
| 24 | PP (1.87) | Butadiene-acrylonitrile (70:30) copolymer (2.5×10⁶) | 100 | 30 | 230 | 7 | H | 220 | 1.0 | 25 | 3.0 | 0.445 | 95 | 21 | 9 |
| 25 | PP (1.87) | Polybutadiene (cis-1,4) (1.7×10⁶) Polyisobutylene (5.0×10⁶) | 130 | 30 / 40 | 180 | 7 | H | 200 | 0.5 | 35 | 3.0 | 0.421 | 125 | 30 | 7 |

¹ Polyethylene of high density. ² Polyethylene of low density. ³ Polypropylene. ⁴ Shaped with a heat press. ⁵ Shaped with an extruder. ⁶ Biaxial and two step. ⁷ 50 and then 120.

Example 2

A mixture of 100 parts of polypropylene having an intrinsic viscosity of 1.93 dl./g. and 80 parts of ethylene-propylene (30:70) copolymer (molecular weight, $1.5 \times 10^5$) is mixed in a mixing roll at 185° C. for 7 minutes. The mixture is shaped to sheets, 0.8 mm. in thickness, by a heat press at 250° C. The sheets are drawn at 35° C., first at a draw ratio of 3 in the machine direction and then at a draw ratio of 3 in the transverse direction to produce voids therein. The drawn sheets are soaked in 1% by weight solution of p-quinone dioxime in acetone at 20° C. for 3 hours, dried and vulcanized while heating at 135° C. for 15 minutes. The properties of the vulcanized sheets are compared with those of the drawn sheets before vulcanization as shown in Table 2.

TABLE 2

|  | Drawn sheet unvulcanized | Drawn sheet vulcanized |
|---|---|---|
| Density (g./cm.³) | 0.135 | 0.167 |
| Tensile strength (kg./cm.²) | 110 | 265 |
| Elongation (percent) | 13 | 20 |
| Recovery from deformation on compression | (¹) | (²) |

¹ Time-requiring.
² Excellent.

Example 3

Drawn sheets are produced by the same process as in Example 2 except that the mixing ratio of the ethylene-propylene copolymer to polypropylene is changed. The properties of the drawn sheets are shown in Table 3 wherein the mixing ratio is represented by parts of the ethylene-propylene copolymer per 100 parts of polypropylene.

TABLE 3

| Mixing ratio | Density (g./cm.³) | | Tensile strength (kg./cm.²) | | Recovery from deformation on compression | |
|---|---|---|---|---|---|---|
| | Before vulcanization | After vulcanization | Before vulcanization | After vulcanization | Before vulcanization | After vulcanization |
| 30 | 0.130 | 0.162 | 150 | 230 | Somewhat good | Somewhat good. |
| 70 | 0.133 | 0.165 | 125 | 240 | do | Good. |
| 150 | 0.142 | 0.173 | 98 | 255 |  | Excellent. |
| 200 | 0.149 | 0.180 | 90 | 260 | Good | Do. |
| 250 | 0.157 | 0.200 | 78 | 240 | do | Do. |

Example 4

A mixture of 60 parts of polypropylene having an intrinsic viscosity of 1.95 dl./g. and 40 parts of polyisobutylene (molecular weight, $2.0 \times 10^5$) is mixed in a mixing roll at 180° C. for 10 minutes. The mixture is shaped to sheets, 0.5 mm. in thickness, by a heat press at 180° C. The sheets are uniaxially drawn at 45° C. at a draw ratio of 2.5 to produce voids therein. The density of the drawn sheets is 0.57 g./cm.³.

The drawn sheets are soaked in fuming sulfuric acid at 95° C. for 10 minutes, whereby the combined sulfur amounts to 3.87% by weight and uniform coloration is observed from the surface to the inside. The thus treated sheets having voids possess cationic ion-exchangeability, dyeability and hygroscopicity.

When the undrawn sheets without voids are treated in the similar manner, the combined sulfur amounts to 0.77% by weight, only the surface of the sheets is colored and the ion-exchange capacity is about $\frac{1}{10}$ of that of the said treated sheets having voids.

Example 5

A mixture of 40 parts of polypropylene having an intrinsic viscosity of 2.5 dl./g., 30 parts of polybutadiene (cis-1,4) (molecular weight, $2.5 \times 10^5$), 20 parts of butadiene-styrene (75:25) copolymer (molecular weight, $4.0 \times 10^5$), 1.5 parts of N-cyclohexyl-2-benzothiazole sulfenamide and 3 parts of sulfur is mixed in a mixing roll at 180° C. for 7 minutes. The mixture is shaped to sheets, 1 mm. in thickness, by a heat press at 230° C. The sheets are uniaxially drawn at 35° C. at a draw ratio of 2.0 to produce voids therein. The density of the drawn sheets is 0.69 g./cm.³.

The drawn sheets are soaked in 97% by weight sulfuric acid at 75° C. for 5 hours, whereby the combined sulfur amounts to 3.55% by weight and uniform coloration is observed from the surface to the inside. The thus treated sheets having voids possess cationic ion-exchangeability, dyability and hygroscopicity.

When the undrawn sheets without voids are treated in the similar manner, the combined sulfur amounts to 1.23% by weight, only the surface of the sheets is colored and the ion-exchange capacity is about $\frac{1}{8}$ of that of the said treated sheets having voids.

Example 6

A mixture of 100 parts of polypropylene having an intrinsic viscosity of 1.87 dl./g., 60 parts of polyisobutylene (mloecular weight, $1.5 \times 10^5$) and 40 parts of butadiene-styrene (75:25) copolymer (molecular weight, $4.0 \times 10^5$) is mixed in a mixing roll at 180° C. for 10 minutes. The mixture is shaped to sheets, 0.5 mm. in thickness, by a heat press at 280° C. The sheets are uniaxially drawn at 65° C. at a draw ratio of 3.5 to produce voids therein. The density of the drawn sheets is 0.573 g./cm.³.

The drawn sheets are soaked in methyl monochloromethyl ether at 30° C. for 48 hours and then in 35% by weight methanol solution of trimethylamine at 5° C. for 150 hours, whereby the combined nitrogen amounts to 2.25% by weight. The thus treated sheets possess an ion-exchange capacity nearly equal to that of a commercially available anionic ion-exchange membrane having quaternary ammonium base groups and the combined nitrogen amounting to 3.55% by weight.

When the sheets having the same composition as above but voided with a conventional blowing agent, i.e. azobisbutyronitrile, are treated in the similar manner, the combined nitrogen amounts to 1.33% by weight and the ion-exchange capacity is about $\frac{1}{3}$ of that of the said sheets voided according to the present invention.

Example 7

The voided sheets (A) obtained in Example 4 and the sheets (B) having the same density and composition as above but voided with a conventional blowing agent, i.e. azobisbutyronitrile, are treated with a variety of resin solutions and the adhesive strength of the produced layer is tested by the friction pull test using a cellophane tape. The results are shown in Table 4.

TABLE 4

| Resin solution | Sheet (A) | Sheet (B) |
|---|---|---|
| 10% by weight solution of chlorinated polypropylene (containing 35% by weight of chlorine) in trichloroethylene. | Excellent | Considerably exfoliated. |
| 10% by weight solution of vinylacetate-ethylene (23:77) copolymer in trichloroethylene. | do | Do. |
| 20% by weight solution of vinylidene chloride (85% by weight)—vinyl chloride (15% by weight) in acetone. | Good | Unsatisfactory. |

The above examples are non-limitative, and it is understood that various modifications known to those skilled in the art may be utilized without departing from the spirit of the invention.

What is claimed is:

1. A process for preparng a permeable, non-transparent, oriented sheet having voids of from $2\mu$ to 5 mm. in size, a density of less than 0.80 g./cm.$^3$ and a leather-like appearance which comprises drawing a sheet of a mixture comprising 100 parts by weight of at least one crystallizable polyolefin and from 30 to 300 parts by weight of at least one elastomer, said drawing being at a temperature below the melting point of the crystallizable polyolefin and either in one direction at a draw ratio of from 1.2 to 7 or first in one direction and then in the transverse direction at a draw area ratio of from 5 to 40.

2. A process according to claim 1 wherein the drawing is effected in only one direction.

3. A process according to claim 1 wherein the drawing is effected in two transverse directions.

4. An oriented, non-transparent, permeable sheet of a mixture comprising 100 parts by weight of at least one crystallizable polyolefin and from 30 to 300 parts by weight of at least one elastomer, said sheet having voids of from $2\mu$ to 5 mm. in size, having a density of less than 0.80 g./cm.$^3$ and having a leather-like appearance.

5. A sheet according to claim 4 wherein the polyolefin is crystalline polypropylene and the elastomer is polyisobutylene.

6. A sheet according to claim 4 wherein the elastomer is vulcanized.

7. a sheet according to claim 4 having ionically exchangeable groups.

8. A sheet according to claim 7 wherein the groups are sulfonic acid groups.

9. A sheet according to claim 7 wherein the groups are quaternary ammonium groups.

10. A sheet according to claim 4 wherein the polyolefin is polypropylene having an intrinsic viscosity of from 1.4 to 4.0 dl./g. in tetralin at 135° C. the elastomer is polyisobutylene having a molecular weight of from 50,000 to 600,000 and the density is less than 0.7 g./cm.$^3$ 11. A sheet according to claim 4 wherein the elastomer comprises a member selected from the group consisting of natural rubber, polyisobutylene, isobutylene/isoprene copolymer, polybutadiene, styrene/butadiene copolymer, acrylonitrile/butadiene copolymer and ethylene/propylene copolymer.

References Cited

UNITED STATES PATENTS

| | | | |
|---|---|---|---|
| 2,631,954 | 3/1953 | Bright | 154—53.5 |
| 3,074,616 | 1/1963 | Martinovich et al. | 229—53 |
| 3,037,954 | 6/1962 | Gessler et al. | 260—29.8 |
| 3,086,947 | 4/1963 | Kuwata et al. | 260—2.2 |
| 3,250,825 | 5/1966 | Martinovich | 260—897 |
| 3,246,061 | 4/1966 | Blatz | 264—95 |
| 3,265,769 | 8/1966 | Schaffhausen | 260—889 |
| 3,265,770 | 8/1966 | Edwards | 260—889 |

OTHER REFERENCES

Kuwada et al., Chem. Abstr. 57, 6155h (1962).

Nishiharz, Chem. Abstr. 50, 16056–16057 (1964).

WILLIAM H. SHORT, *Primary Examiner.*

M. GOLDSTEIN, *Assistant Examiner.*